United States Patent Office 2,765,306
Patented Oct. 2, 1956

2,765,306

2-DIALKYLAMINOMETHYL-5-METHYL-1,6 HEX-ANE DIAMINES AND RELATED COMPOUNDS

David C. England, Wilmington, Del., assignor to E. I. du Pont de Nemours and Company, Wilmington, Del., a corporation of Delaware No Drawing. Application June 29, 1953,
Serial No. 364,944

9 Claims. (Cl. 260—247.5)

This invention relates to new compositions of matter and to methods for their preparation.

Aliphatic diprimary diamines containing also tertiary amine functions are a relatively unexplored class of polyamines. Typical of this class of polyamines is 3-N-dimethylamino-1,6-diaminohexane,

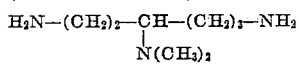

which is obtained by reducing the adduct of 1,4-dicyano-2-butene or its isomer, 1,4-dicyano-1-butene, with a secondary aliphatic amine, as described in U. S. 2,532,561. In this polyamine the tertiary amino nitrogen is linked directly to a chain carbon atom. This has resulted in disadvantages in certain polymer forming and polymer-modifying applications, and accordingly a need has arisen for diprimary diamines having, in addition, tertiary amine functions which, however, are not directly attached to a chain carbon.

The present invention provides a new class of such amines. In particular embodiments this novel class of compounds includes those carrying a tertiary amino nitrogen function formed by hydrogenation of the adducts of alpha-methylene-delta-methyladiponitrile with acyclic, alicyclic, and heterocyclic secondary amines.

The new aliphatic tertiary amines of this invention are those which have two primary amino groups separated by a chain of six carbon atoms, and one tertiary amino nitrogen atom linked to the carbon chain through a singly bonded methylene group. The compounds to which the invention is directed in particular embodiments are tertiary amines of the formula

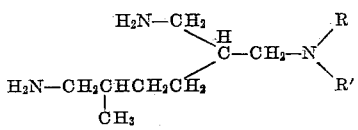

wherein R and R' taken individually each represents a lower alkyl group, and taken together represent a divalent saturated aliphatic group which conjointly with HN< forms a heterocycle, e. g. a morpholino, thio-morpholino, piperazyl or piperidine ring.

The new tertiary-amino-nitrogen-containing aliphatic diprimary amines of this invention are readily prepared from alpha-methylene-delta-methyladiponitrile-secondary amine type adducts, e. g. by reacting in 1:1 mole ratios alpha-methylene-delta-methyladiponitrile with the desired secondary amine, desirably in the presence of an inert solvent, and then fractionally distilling and converting the dinitrile thus obtained to the corresponding diamine by reduction, desirably by catalytic hydrogenation in the presence of liquid ammonia over a base metal hydrogenation catalyst, such as alloy skeleton nickel or cobalt.

EXAMPLE I

To a mixture of alpha-methylene-delta-methyladiponitrile (134 g., 1 mole) and a 33% aqueous solution of dimethylamine (272 g., 2 moles) is added 200 cc. of dioxan to give a clear solution. This mixture is warmed for 30 minutes on a steam bath and then distilled. After removal of a foreshot, there is obtained 150 g. (85%) of the adduct, B. P. 152–156° C./4 mm., $n_D^{25}$ 1.4519.

The above adduct (89.5 g., 0.5 mole) is transferred to a pressure reactor and hydrogenated in liquid ammonia (40 g.) over alloy-skeleton cobalt (10 g.) at 120° C. and 2500 lb./sq. in. pressure for 1 hour. Distillation of the product gives 75.5 g. (87%) of 2-dimethylaminomethyl-5-methyl-1,6-hexanediamine, B. P. 116° C./4 mm., $n_D^{25}$ 1.4688, N. E. 62.6 (titration for primary amino groups—theory 62.3).

EXAMPLE II

A mixture of alpha-methylene-delta-methyladiponitrile (67 g., 0.5 mole), 45 g. (0.52 mole) of morpholine, and about 0.1 g. of sodium methoxide is refluxed at 160° C. for 1 hour and then cooled. It is extracted with ether, the ether extract washed with water and then extracted with dilute hydrochloric acid. The acid extract is made basic with sodium hydroxide and extracted with ether. Removal of ether gives 21 g. (19%) of crude product. Distillation gives 13.5 g. of a compound boiling at 197° C./4 mm., $n_D^{25}$ 1.4740.

The above adduct (31 g.) is hydrogenated over alloy-skeleton cobalt (5 g.) at 125° C. and 2500 lbs./sq. in., pressure for 1 hour in 10 cc. of dioxan and 25 g. of liquid ammonia. There is obtained 27.8 g. (87%) of 2-morpholinomethyl-5-methyl-1,6-hexanediamine, B. P. 169° C./6 mm., $n_D^{25}$ 1.4883, N. E. 114.1 (theory 114.5—titration for primary amino groups). Analysis shows the compound to contain 18.2% N, theory for $C_{12}H_{27}N_3O$ is 18.4.

The alpha-methylene-delta-methyladiponitrile used in the above examples is prepared as described in U. S. Patent 2,566,203.

The secondary amines added to the alpha-methylene-delta-methyladiponitrile are those of the general formula

in which R and R' may be monovalent organic radicals or together may form a divalent organic radical whose divalency emanates from different carbon atoms; R and R' may be wholly hydrocarbon or may comprise a bivalent chain of carbon atoms interrupted by oxygen, nitrogen, or sulfur. The alkyl groups may contain up to 18 carbon atoms, or more. It is preferred that the alkyl groups be lower alkyl groups, i. e., contain less than 6 carbon atoms. Especially useful and preferred compounds are those in which R and/or R' are methyl, ethyl, or propyl because of their readily availability. When R and R' are divalent organic radicals, it is preferred that they be radicals which form 5 and 6 membered ring systems with the nitrogen. These rings may thus contain only carbon and nitrogen or they may contain carbon, nitrogen, and oxygen or carbon, nitrogen, and sulfur.

Examples of secondary amines of the above types are dimethylamine, methylethylamine, dicyclohexylamine, dioctylamine, didodecylamine, dioctadecylamine, methylethoxyethylamine, N-methylcyclohexylamine, morpholine, piperidine, piperazine, 1-methylpiperazine, and the like.

The tertiary amino nitrogen-containing primary aliphatic amines of this invention have the two primary amino nitrogens separated by a chain of carbon atoms and the tertiary amino group linked to a chain carbon through a singly bonded methylene group. The two remaining valences of the tertiary amino nitrogen atom are satisfied by the radicals R and R' as hereinabove defined.

A most significant advantage of the compositions of this invention over the prior art compositions having tertiary nitrogen attached directly to the chain of carbon atoms separating the —NH₂ groups resides in the thermal stability of the polyamides derived therefrom. The said prior art compositions upon conversion to polyadipamides or other polyamides in the well-known manner yield products which break down at considerably lower temperatures than do the corresponding polyamides from the diamines herein disclosed. The explanation for this difference may lie in the fact that the prior art structure had a single hydrogen on the chain carbon to which the tertiary nitrogen was attached, while in the composition of this invention there is no hydrogen similarly disposed.

In the first column of the table below are listed secondary amines to be substituted for the dimethylamine of Example I in the process of Example I to produce the adducts listed in the second column and the diamines to be obtained by reduction of the adducts in accord with the process of Example I in the third column.

Table I

| Secondary Amine | Adduct | Diamine |
| --- | --- | --- |
| Dipropylamine | 2-Dipropylaminomethyl-5-methyl-adiponitrile. | 2-Dipropylaminomethyl-5-methyl-1,6-hexane-diamine. |
| Dihexylamine | 2-Dihexylaminomethyl-5-methyl-adiponitrile. | 2-Dihexylaminoethyl-5-methyl-1, 6-hexane-diamine. |
| Dioctylamine | 2-Dioctylaminomethyl-5-methyl-adiponitrile. | 2-Dioctylaminomethyl-5-methyl-1, 6-hexane-diamine. |
| Didodecylamine | 2-Didodecylaminomethyl-5-methyl-adiponitrile. | 2-Didodecylaminomethyl-5-methyl-1, 6-hexane-diamine. |
| Dioctadecylamine | 2-Dioctadecylaminomethyl-5-methyl-adiponitrile. | 2-Dioctadecylaminomethyl-5-methyl-1, 6-hexanediamine. |
| Methylethoxy-ethylamine. | 2-Methylethoxy-ethyl-aminomethyl-5-methyladiponitrile. | 2-Methylethoxyethyl-aminoethyl-5-methyl-1, 6-hexanediamine. |
| 2-methylpiperidine | 2-(2-Methylpiperidine)-methyl-5-methyladiponitrile. | 2-(2-Methylpiperidine) hexanediamine. |
| N-methylpiperazine | 2-(1-Methyl-1-piperazyl)methyl-5-methyladiponitrile. | 2-(1-Methyl-1-piperazyl) methyl-5-1,6-hexanediamine |
| Methylethylamine | 2-Methylethylaminomethyl 5-methyladiponitrile. | 2-methylethylaminomethyl-5-methyl-1, 6-hexanediamine. |
| N-methylcyclo-hexylamine. | 2-(N-Methylcyclohexyl-aminomethyl)-5-methyladiponitrile. | 2-(N-Methylcyclohexyl-aminomethyl)-5-methyl-1, 6-hexanediamine. |
| Dicyclohexylamine | 2-Dicyclohexylaminomethyl 5-methyladiponitrile. | 2-Dicyclohexylaminomethyl-5-methyl-1,6-hexanediamine. |
| 2-(Benzhydryl-mercapto)-N-methylethylamine. | 2-[2-(Benzhydryl-mercapto) N-methylethylaminomethyl] 5-methyladiponitrile. | 2-[2-Benzhydrylmercapto-N-methyl-ethylaminomethyl]-5-methyl-1,6-hexanediamine. |
| N, N, N-Triethyl-enediamine. | 2-(2-Diethylamino-ethyl-aminomethyl)-5-methyladiponitrile. | 2-(2-Diethylaminoethylaminomethyl)-5-methyl-1,6-hexanediamine. |
| Thiamorpholine | 2-Thiamorpholinomethyl-5-methyl-adiponitrile. | 2-Thiamorpholinomethyl-5-methyl-1, 6-hexanediamine. |

In preparing the new aliphatic diamines of this invention, the alpha-methylene-delta-methyladiponitrile and secondary amine are mixed in approximately equimolar proportions and the mixture warmed on a water bath. In some cases the use of a slight excess, e. g., of the order of 5 to 10% by weight of one or the other reactants may be used. When the amine is low in cost as much as 0.5 to 5 molar excess may be used to insure maximum conversion.

The reaction is generally complete in about an hour at temperatures in the raneg of 80–110° C. If desired, however, it may be permitted to take place at room temperature but this prolongs the time of reaction and increases costs.

Although the addition reaction occurs readily in the absence of added catalysts, in the case of amines which are feebly basic it may be desirable to include a catalyst in the reaction mixture and thus reduce the time of reaction. Suitable catalysts are alkaline materials, particularly metallic alkoxides such as sodium and potassium alkoxides, and the like.

The reduction of the nitrile groups in the alpha-methylene-delta-methyladiponitrile-secondary amine adduct may be effected catalytically or chemically.

The chemical reduction can be effected with sodium and alcohol, with aluminum or lithium hydride, and the like.

The catalytic hydrogenation is performed under pressure at elevated temperatures in the presence of a hydrogenation catalyst known to promote the conversion of nitrile groups to primary amino groups. Suitable catalysts are nickel and cobalt, especially alloy-skeleton nickel and alloy skeleton cobalt.

The amount of catalyst, calculated as the metal, may range from 0.001 to 15% by weight of the alpha-methylene-delta-methyladiponitrile-secondary amine adduct. Since best results from the standpoint of reaction rate are achieved within the range of 1 to 10%, calculated on the same basis as above, this is the amount generally used.

The chemical reduction is generally carried out by adding the reducing agent to a solution of the adduct in a suitable solvent at such rate as to maintain the reaction mixture below reflux.

For best results it is desirable to conduct the catalytic hydrogenation at as low a temperature as possible, consistent with a practical rate of reaction. In general, temperatures within the range of 50 to 200° C. are used but since the best over-all balance of yield of desired amine with reaction rate is obtained in the range of 100 to 150° C., this range embraces the preferred operating conditions.

The hydrogenation is effected at elevated pressures because this aids in reducing the time of reaction and in improving the yield of desired amine. Generally, pressures above 500 lb./sq. in. are used. Especially useful are pressures in the range of 1000 to 5000 lbs./sq. in.

Although the use of a solvent is not essential, for most efficient operation it is desirable to perform the hydrogenation in the presence of a solvent. Suitable solvents are alcohols, saturated hydrocarbons, anhydrous ammonia, etc.

The tertiary amino nitrogen containing aliphatic diamines of this invention are useful for conversion to polyamines, especially to fiber-forming polyamides possessing enhanced acid dyestuff uptake. They are also useful as intermediates for pharmaceuticals, insecticides, and other industrially useful products.

I claim:

1. A tertiary amine of the formula

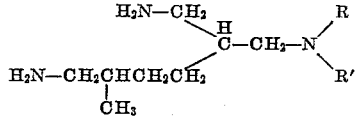

wherein R and R' taken individually each represents a saturated hydrocarbon group and taken together represent a divalent saturated aliphatic group which conjointly with HN< would form a 5 to 6 membered ring, said ring being further characterized in that it contains no members other than carbon, nitrogen, oxygen and sulfur, said ring containing from 4 to 5 carbon atoms, two of which are attached directly to the nitrogen of the said HN< group, said saturated hydrocarbon group having not more than 18 carbon atoms.

2. A tertiary amine of the formula

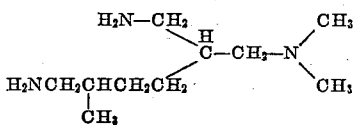

3. A tertiary amine of the formula

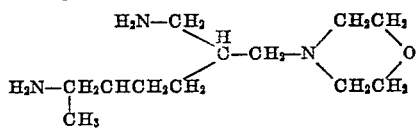

4. A process for preparing a tertiary amine which comprises reacting an adduct of alpha-methylene-delta-methyl-adiponitrile and a secondary amine, having a mol ratio of these components of 1:1, with hydrogen in the presence of liquid ammonia and a hydrogenation catalyst, and separating from the resulting mixture the tertiary amine produced by the said reaction, said secondary amine having the formula

wherein R and R' taken individually each represents a saturated hydrocarbon group and taken together represent a divalent saturated aliphatic group which conjointly with H—N< forms a 5 to 6 membered ring, said ring being further characterized in that it contains no members other than carbon, nitrogen, oxygen and sulfur, said ring containing from 4 to 5 carbon atoms, two of which are attached directly to the nitrogen of said H—N< group, said saturated hydrocarbon group having not more than 18 carbon atoms.

5. Process of claim 4 wherein said secondary amine is a dialkyl amine.

6. Process of claim 4 wherein said secondary amine is morpholine.

7. Process of claim 4 wherein the said hydrogenation catalyst contains cobalt as an active component.

8. Process of claim 7 wherein the temperature during hydrogenation is from 50° to 200° C. and the pressure is above 500 lb./sq. in.

9. Process of claim 7 wherein the temperature is from 100° to 150° and the pressure is above 500 lbs./sq. in.

References Cited in the file of this patent
UNITED STATES PATENTS

| | | |
|---|---|---|
| 2,436,779 | Senkus | Feb. 24, 1948 |
| 2,532,277 | Castle | Dec. 5, 1950 |
| 2,532,561 | Langkammerer | Dec. 5, 1950 |